United States Patent [19]

Snaper

[11] Patent Number: 4,724,312

[45] Date of Patent: Feb. 9, 1988

[54] PROXIMITY DETECTION AND WARNING SYSTEM HAVING A LIGHT PULSE SENSOR AND CIRCUIT RESPONSIVE ONLY TO PARTICULAR SELECT FREQUENCIES

[76] Inventor: Alvin A. Snaper, 2800 Cameo Cir., Las Vegas, Nev. 89107

[21] Appl. No.: 821,391

[22] Filed: Jan. 22, 1986

[51] Int. Cl.[4] .................................... G01J 1/20

[52] U.S. Cl. .................... 250/203 R; 250/214 B; 250/221; 356/4

[58] Field of Search ............ 250/203 R, 214 B, 221, 250/222.1; 356/1, 4

[56] References Cited

U.S. PATENT DOCUMENTS

| | | | |
|---|---|---|---|
| 3,781,842 | 12/1973 | Campman | 250/221 |
| 3,803,572 | 4/1974 | Campman | 250/221 |
| 3,987,297 | 10/1976 | Brienza et al. | 250/203 R |
| 4,159,419 | 6/1979 | Wittke | 250/203 R |
| 4,179,691 | 12/1979 | Keller | 250/221 |
| 4,276,472 | 6/1981 | Costantino et al. | 250/214 B |
| 4,315,690 | 2/1982 | Trocellier et al. | 250/203 R |

*Primary Examiner*—David C. Nelms
*Assistant Examiner*—William L. Oen
*Attorney, Agent, or Firm*—Donald D. Mon

[57] ABSTRACT

A proximity detecting and warning system for use in collision avoidance, particularly with aircraft. The system responds to pulsed light sources within a selected frequency band and particularly the frequency of aircraft strobe and rotating beacon light sources while disregarding any other natural steady state light sources as well as man-made light sources such as street lighting and ground lighting sources. The system detects pulsed light sources on aircraft or vehicles within the proximity of the transmitter and provides a visual and audible alarm to a pilot or operator. The alarm occurs when another aircraft is within the detection envelope which typically extends in an elliptical pattern around the transmitter in all directions with a detection range of up to approximately three miles. The circuit is designed to detect the strobe or rotating beacons having frequencies standardized by Federal Regulations which also require that these sources be illuminated at all times during flight. The proximity sensing system has a light pulse detector, a circuit for limiting the response of the device to the particular frequencies selected, and processing circuits which process received signals to discriminate between the selected frequencies and activates the visual and audible alarms.

10 Claims, 2 Drawing Figures

PROXIMITY DETECTION AND WARNING SYSTEM HAVING A LIGHT PULSE SENSOR AND CIRCUIT RESPONSIVE ONLY TO PARTICULAR SELECT FREQUENCIES

FIELD OF THE INVENTION

This invention is related to collision avoidance systems and is more particularly related to proximity detection, warning and aircraft collision avoidance systems sensitive to pulsed light sources.

BACKGROUND OF THE INVENTION

Collision avoidance systems presently in use are expensive, sophisticated, complex and often require interaction with other systems to be effective. Even the very sophisticated electronic systems available today have not been completely successful in avoiding midair collisions of aircraft, particularly with small aircraft. Most midair accidents in recent history could have been avoided if there had been some device or system on board either aircraft to alert the pilot of the near proximity of the other aircraft. Sophisticated systems utilize radar or radio signals that can activate similarly equipped aircraft. However, these devices are active in nature, meaning that they must transmit and receive certain signals in order to provide a warning. Thus, to be effective all aircraft must be equipped with the same system for the overall system to function effectively. Further, owners of small aircraft cannot afford the thousands of dollars to install this equipment in a relatively inexpensive aircraft which may cost less than the collision avoidance system. Taking into consideration both the high cost and the inconsistent reliability a different approach to aviation collision avoidance and proximity warning systems is needed.

It is therefore one object of the present invention t provide a proximity detection and warning system which is low in cost but reliable.

Another object of the present invention is to provide a proximity detection and warning system that operates independent of dedicated systems in other aircraft.

Still another object of the present invention is to provide a proximity detector and warning system which is sensitive to a characteristic nearly all aircraft have which will provide a warning when such an aircraft is within a predetermined distance.

Still another object of the present invention is to provide a proximity detection and warning system which is sensitive to pulsed light sources within the envelope of the detection system.

Still another object of the present invention is to provide a proximity warning and detection system tuned to the frequency of pulsed light emitted from an object while rejecting all other sources of light.

BRIEF DESCRIPTION OF THE INVENTION

The purpose of the present invention is to provide a proximity detection and warning system which alerts an operator of an object with which it could potentially collide within the envelope of the detection system. Such a system can be useful for aircraft, ambulances, fire truck and police vehicles as well as private vehicles to enable an operator to detect the presence of a vehicle or aircraft and take evasive action.

The proximity warning and detection system is comprised of a detector sensitive to the pulsed light from strobe lights or falshing lights on vehicles or aircraft. The output of the detector is processed through a blocking circuit to block ambient, man-made or any other non-pulsing light. Filter circuits limit the sensitivity of the system to light frequency selected. Frequency discrimination is provided by a band pass filter whose limits respond to light sources within the frequency of the filter. Further processing in the detection circuit determines whether the light pulse signals are the type of pulse from flashing lights and whether the signal is sufficient to trigger a warning alarm or indicator.

The light detector is selected to detect light in a preselected portion of the frequency spectrum and provide a signal processed by a coordinate convertor to determine the angle and relative distance to the detected target. The coordinate convertor is an X, Y coordinate convertor which samples the detected pulse levels from several sensors and provides an output indicating the direction and relative distance.

One version of the system is sufficiently sensitive to be directed towards general aviation VFR (visual flight rules) aircraft application. A two to three mile range is suitable for that purpose. A less sensitive system could have a range of 1,000 to 1,500 feet which would be suitable for control of traffic signals by emergency vehicles. For example, ambulances, fire trucks and police vehicles with flashing strobes or beacons can automatically turn traffic signals red at the selected distance to stop non-emergency traffic. An even less sensitive system with a range of perhaps 500 feet could be useful in automobiles to enable a driver to detect the presence of emergency vehicles despite closed windows, air-conditioners and a blaring radio.

The above and other features of the invention will be fully understood from the following detailed description and the accompanying drawings, in which.

DETAILED DESCRIPTION OF THE INVENTION

Figure 1:
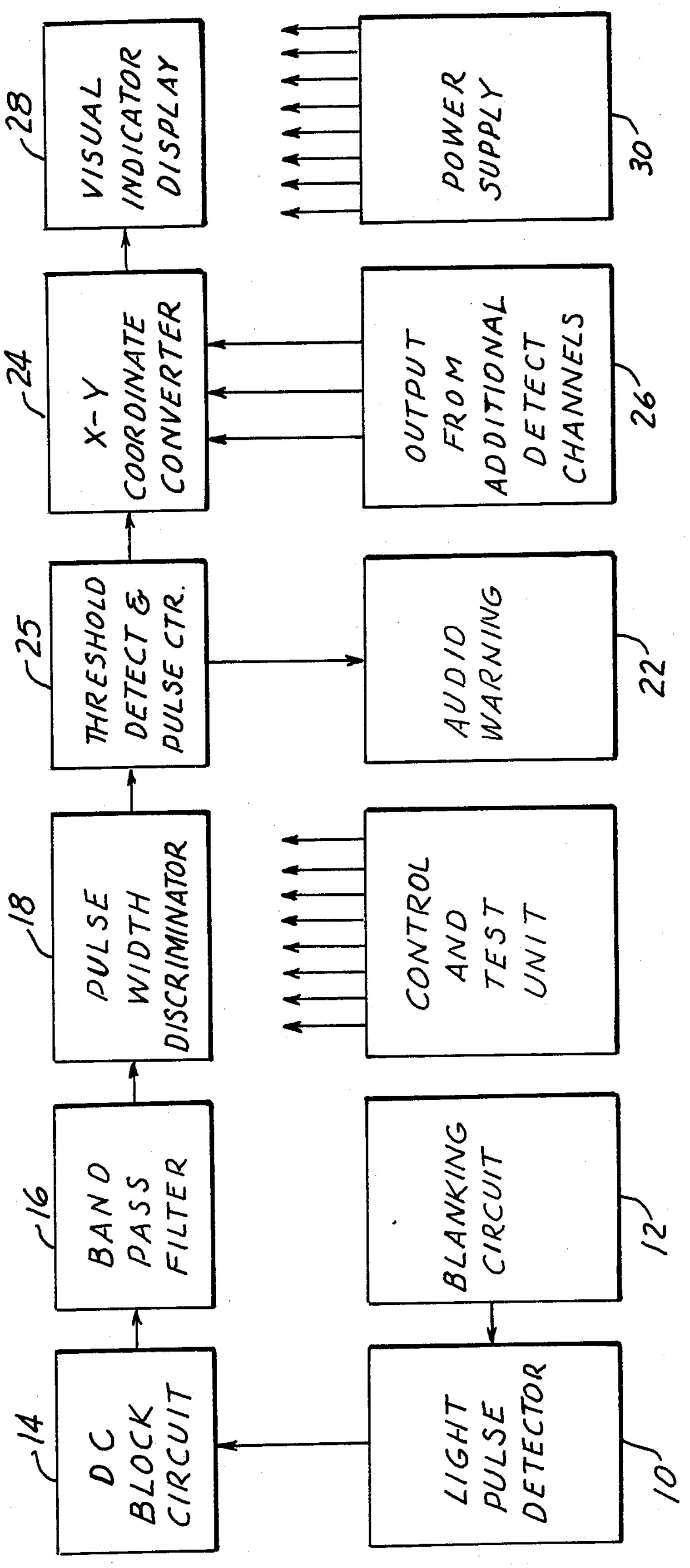
FIG. 1 is a block diagram of a proximity detection and warning system.

A proximity detection and warning system is illustrated in the block diagram of FIG. 1. A light pulse detector 10 is provided which is a specially selected photo transistor sensitive to a light band within a wide spectrum which includes pulsed light sources. That is it is selected for sensitivity in the 0.5 micron to 1.0 micron wavelength light region. To prevent light pulse detector 10 from responding to pulsing strobes on the host vehicle blanking circuit 12 is provided which inhibits the light pulse detect photo transistor 10 from operating when the host vehicle or aircraft's own lights are flashing. Each flash of the host's lights causes an output from blanking circuit 12 which interrupts operation of light pulse detector 10.

When photo transistor or light pulse detector 10 detects a light pulse in the wavelength it is sensitive to it provides an output to DC blocking circuit 14. DC block circuit 14 is comprised of a resistor and capacitor combination network which blocks transfer of all output from phototransistor 10 not produced by pulsed light sources. Thus DC block circuit 14 allows only pulsed light to pass to the subsequent processing circuitry. The output of the DC block circuit is then fed to a band pass filter 16 which strips away all frequency response not in the pass band of the filter. This effectively eliminates all pulsed light sources other than those selected for detection.

Protection against other unwanted pulse light sources is further provided by pulse width discriminator 18 which will eliminate unwanted momentary light pulsed signals such as lightning, sunlight, moonlight, random flashes, etc. Discrimination circuit 18 further increases the sensitivity of the system to only the pulse light sources selected for detection.

Threshold detect circuit 20 adjusts the processing circuit sensitivity to the range (i.e., distance) desired. Detected signals which are not above a pre-set threshold of detector 20 will not trigger any warning. Thus the detection range can be selected by appropriate adjustment of threshold detect circuit 20. The more sensitive the circuit the greater the range. As indicated previously for aircraft this may be up to three miles, while for land based private vehicles it may be as low as 500 feet. When a signal in the proper frequency having the proper intensity to activate threshold detect circuit 20 is detected the output activates an audio warning device 22 which may be any type of horn, bell or any suitable audio warning system.

The output from the threshold detector is also connected to X, Y coordinate convertor 24 which receives outputs from one or more additional detect channels 26. The X, Y coordinate convertor determines the angle and relative distance to the detected target by sampling and comparing the detected pulse levels from several sensors of the additional detector channels. The output of the X, Y coordinate convertor activates a LED or LCD or other visual indicator display 28. The entire system can be operated by a power supply 30 which can be an on-board battery or power supply or from a separate power supply.

In use on an aircraft several light pulse detectors and associated circuitry can be positioned on the fuselage and wings of an aircraft to detect other approaching aircraft. On an aircraft at least two and preferably three to four of the detection devices and associated circuitry would be desirable. The modest cost and relative simplicity of the circuitry will permit the use of several channels even on small aircraft.

For emergency and private land based vehicles a single detector would probably be sufficient as the range and direction information is not really as critical as with aircraft.

Figure 2:
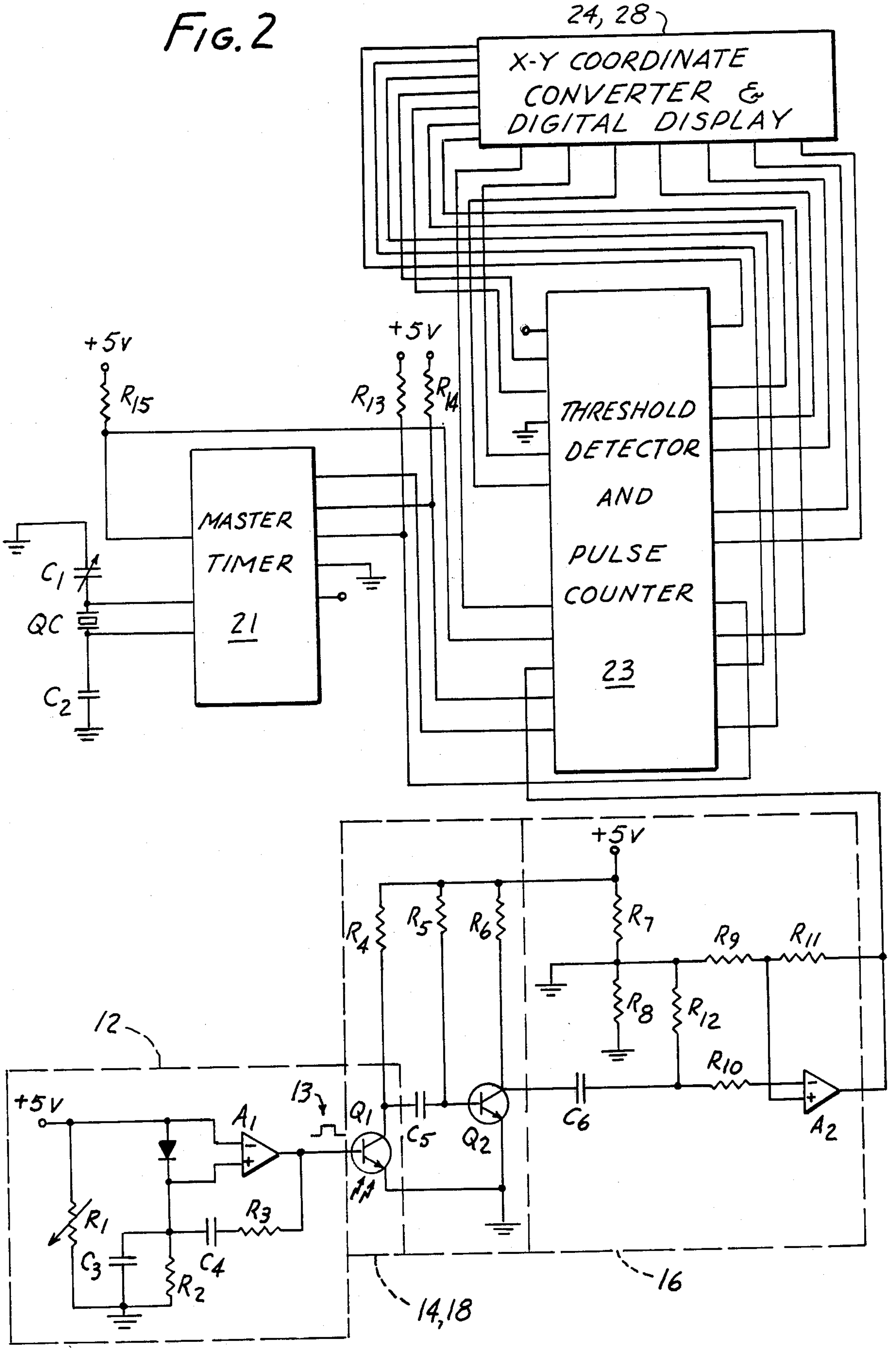
FIG. 2 is a semi-schematic circuit diagram for the proximity detection and warning system for FIG. 1.

In the semi-schemetic circuit diagram of FIG. 2 a circuit suitable for use in the proximity detection and warning system is shown. Part numbers are given by way of example for suitable components for use in the system circuit.

Blanking circuit 12 is comprised of an RCA 3140 amplifier A1 configured to provide a blanking pulse as shown at 13, synchronized to the strobe pulses of the host aircraft lights which inhibits a response to the host aircraft's own flashing lights. Pulse 13 inhibits operations of light pulse detector Q1 which may be a FPT 100 phototransistor. DC blocking and pulse width discrimination circuits 14, 18 are provided by transistor Q2 (2N2222) and its associated circuitry which limits detection to only selected pulsed light sources. Bandpass filtering is provided by an RCA 3130 amplifier A1 and its associated circuitry configured to strip away all frequencies not in the pass band of filter 16.

Preferably also included with the system is a control and test unit 15 (FIG. 1). This unit contains all the controls and associated circuitry for built in operation and system checkout testing.

Threshhold detect and pulse counting circuit 20 is comprised of an Intersil 7208 integrated circuit (IC) 23 and Intersil 7207A clock 21 as a master timer controlled by capacitors C, C2 and crystal QC. The output of threshhold detect circuit is connected to an X-Y coordinate converter for display on a digital display. As shown in FIG. 1 the X-Y coordinate converter also receives inputs from other detect channels processes them and display the position of the approaching target or aircraft on digital display 28 which may be a common cathode LED display.

This invention is not to be limited by the embodiment showing the drawings and described in the description which is given by way of example and not of limitation but only in accordance with the scope of the appended claims.

I claim:

1. An optical proximity collision avoidance system mounted on a medium of transportation comprising;

optical detecting means responsive to a pulsed light source in the visible and near visible range mounted on another medium of transportation;

detection preventive means preventing detection of unwanted light sources; said detection preventive means preventing detection of all light from sources other than a prescribed pulsed light source including a pulsed light source mounted on said medium of transportation;

distance determining means for determining the relative distance of a detected pulsed light source;

direction determining means determining the relative direction of a detected pulsed light source;

indicating means indicating the relative direction of said detected pulsed light source; and alarm indicating means indicating the detection of a prescribed pulsed light source within a distance determined by said distance determining means.

2. The system according to claim 1 in which said detection preventive means includes;

blocking means connected to said optical detecting means for blocking steady state light sources.

3. The system according to claim 2 in which said discriminating means includes band pass filter means receiving the output of said blocking means; said band pass filter means rejecting all pulsed light sources outside the pass band of said filter means.

4. The system according to claim 3 in which said discriminating means includes pulse width discriminating means for rejecting unwanted momentary pulsed light signals.

5. The system according to claim 1 in which said distance determining means includes light amplitude detecting means for detecting whether the amplitude of said detected pulsed light source is sufficient to trigger said alarm indicator.

6. The system according to claim 5 in which said amplitude detector comprises a threshold detector.

7. The system according to claim 1 in which said direction determining means includes location detection means for detecting the location of said selected pulsed light source.

8. The system according to claim 7 in which said location detector means comprises;

a plurality of said optical detecting sources;

coordinate converting means for comparing and converting the output of said plurality of optical detecting means;

display means receiving and displaying the output of said coordinate convering means.

9. The system according to claim 1 in which said optical detecting means includes a photo-transistor sensitive to light sources in the visible spectrum.

10. The system according to claim 9 in which said phototransistor is sensitive to frequencies in the range of 0.5 to 1.0 microns.

* * * * *